United States Patent [19]

Murphy

[11] Patent Number: 5,031,378
[45] Date of Patent: Jul. 16, 1991

[54] METHOD OF INSERTING A RIVET INTO A ROOF STRUCTURE

[75] Inventor: Colin R. R. Murphy, Morristown, N.J.

[73] Assignee: Engineered Construction Components (America) Inc., Panama City, Panama

[21] Appl. No.: 515,360

[22] Filed: Apr. 26, 1990

Related U.S. Application Data

[63] Continuation of Ser. No. 151,157, Feb. 1, 1988, abandoned, which is a continuation-in-part of Ser. No. 936,898, Dec. 1, 1986, Pat. No. 4,736,560.

[51] Int. Cl.⁵ .................................................. E04D 3/35
[52] U.S. Cl. ........................................ 52/747; 52/410; 52/741
[58] Field of Search .................. 52/741, 747, 159, 160, 52/410; 411/29–31, 34, 35, 37, 38, 42–52, 57

[56] References Cited

U.S. PATENT DOCUMENTS

| | | | |
|---|---|---|---|
| 2,959,897 | 11/1960 | Baker | 52/410 |
| 3,192,821 | 7/1965 | Siebol . | |
| 3,368,446 | 2/1968 | Glenn | 411/57 |
| 3,515,028 | 6/1970 | Patton . | |
| 3,671,061 | 6/1972 | Dawdy | 52/483 |
| 3,855,745 | 12/1974 | Patterson | 52/159 |
| 3,906,832 | 9/1975 | Lunn | 411/29 |
| 4,388,031 | 6/1983 | Rodgers . | |
| 4,474,517 | 10/1984 | Navoczynski | 411/57 |
| 4,736,560 | 4/1988 | Murphy | 411/29 |

FOREIGN PATENT DOCUMENTS

| | | | |
|---|---|---|---|
| 725903 | 1/1966 | Canada | 411/43 |
| 2334385 | 1/1975 | Fed. Rep. of Germany . | |
| 1553116 | 12/1968 | France | 411/44 |
| 854828 | 11/1960 | United Kingdom | 411/49 |

Primary Examiner—John E. Murtagh
Attorney, Agent, or Firm—Elliot M. Olstein; Raymond J. Lillie

[57] ABSTRACT

A method of inserting a rivet having at least a body portion and a mandrel having means for cutting and peeling back the rivet into portions which curl back on the rivet body into a solid substance. The rivet and mandrel are inserted into the solid substance without completely piercing through the solid substance. The rivet is then cut and peeled back into portions which curl back on the rivet body within the solid substance. The invention is also directed to a product comprising a solid substance, and a material fastened to the solid substance by at least one rivet which extends through the at least one material and into the substance without completely piercing through the substance. The at least one rivet has been cut back into portions which curl back on the rivet body, thereby attaching the material to the solid substance.

14 Claims, 2 Drawing Sheets

METHOD OF INSERTING A RIVET INTO A ROOF STRUCTURE

This application is a continuation of application Ser. No. 151,157, filed Feb. 1, 1988, now abandoned, which was a continuation-in-part of application Ser. No. 936,898, filed Dec. 1, 1986, now U.S. Pat. No. 4,736,560.

This invention relates to a rivet, and more particularly to a combination of a rivet and mandrel. Still more particularly, this invention relates to a combination of a rivet and mandrel which is particularly suited for roofing wherein the rivet is cut and peeled back within a roofing substrate.

Rivets are generally known in the art, and such rivets are generally comprised of a rivet and mandrel which are employed in combination with a riveting tool for securing the rivet.

In general, when employing a rivet for fastening, it is necessary to predrill a hole for inserting the combination of rivet and mandrel into both the material which is to be fastened and the substrate to which the material is to be attached. This generally required precise drilling of a hole so as to permit proper fastening.

In addition, in general, previous rivets were limited in length, with such rivets generally having a length of no greater than about two inches.

Furthermore, the strength of rivets was generally limited, whereby the rivets could not be employed for certain fastenings which require increased strength.

Also, previous rivets were cut and peeled back into portions which curl back on the rivet body after the rivet and mandrel were driven completely through a substrate. The cut portions of the rivet would abut against a surface of the substrate, thus clamping the portions or layers of the substrate together.

The present invention is directed to providing an improved combination of rivet and mandrel, as well as an improved mandrel for a rivet.

In accordance with one aspect of the present invention, there is provided a mandrel for a rivet which includes a first portion for insertion into a riveting tool, and a second opposite portion, which terminates in a self-piercing end.

In accordance with another aspect of the present invention, there is provided a mandrel for a rivet which includes means for cutting and peeling back a rivet body into separate portions which curl back on the rivet body thereby to increase the fastening strength of the rivet.

In accordance with a further aspect of the present invention, there is provided a combination of a rivet and mandrel wherein the portion of the mandrel which extends outwardly from the rivet body includes a self-piercing end.

In accordance with still another aspect of the present invention, there is provided a combination of rivet and mandrel wherein the portion of the mandrel which extends outwardly from the rivet body includes means for cutting and peeling back the rivet body in separate portions which curl back on the rivet body to increase the fastening strength thereof.

This invention is also directed to a method comprising inserting a rivet and mandrel into a solid substance or substrate without piercing completely through the substance and cutting and peeling back the rivet into portions which curl back on the rivet body within the substance. The rivet is generally employed for attaching a material to a solid substrate whereby the rivet pierces completely through such material but does not pierce completely through the solid substrate to which the material is to be attached. The substrate may comprise a roof deck and a roofing material may be attached to the roof deck. A layer of insulation and/or a roofing membrane may overlie the roof deck as part of the roofing material.

The invention is also directed to a method of fastening at least one material to a solid substance by inserting a rivet and mandrel through at least the first one material and into the substance without completely piercing through the solid substance. The rivet is then cut and peeled back into portions which curl back on the rivet body within the solid substance, thereby fastening the at least one material to the solid substance.

Applicant's invention also includes a product comprising a solid substance and at least one rivet as described above having at least a body portion, said rivet having been inserted in said solid substance without completely piercing through the solid substance and said rivet having been cut and peeled back into portions which curl back on the rivet body within said solid substance. The solid substance may be a type of solid substance as described above. Preferably, the solid substance is a roof deck and a roofing material such as a roofing membrane and/or a layer of insulation attached to the roof deck. The product may further comprise a mandrel extending outwardly from the body portion of the rivet. The mandrel may include a self-piercing end and means for cutting and peeling back the rivet into portions which curl back on the rivet body. It is to be understood however, that a self-piercing point is not necessarily required for introducing the rivet and mandrel into the solid substance.

In accordance with still another aspect of the present invention, there is provided a rivet, having an increased length.

The invention will be further described with respect to the accompanying drawings, wherein:

FIG. 1 of the drawings illustrates a preferred embodiment of a combination of a rivet and mandrel in accordance with the present invention;

FIG. 2 of the drawings illustrates the combination of FIG. 1, wherein the mandrel has peeled back the rivet body;

Figure 1:
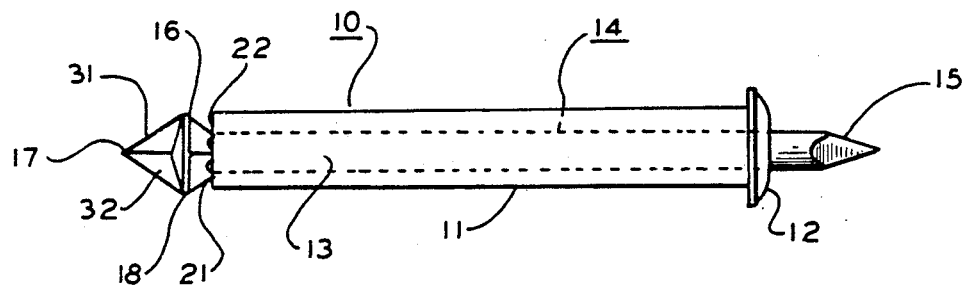

Referring now to FIG. 1 of the drawings, there is shown a rivet, generally designated as 10, which is comprised of a cylindrical main body portion 11, and a head portion 12.

The rivet 10 is provided with a central bore 13 which receives a rivet mandrel, generally indicated as 14.

The rivet mandrel has an essentially cylindrical shape, and terminates in a first end portion 15, which is adapted to be received in a riveting tool.

The end of the rivet mandrel 14 opposite to end 15 is comprised of an enlarged head portion, generally designated as 16 which is exterior to and adjacent to the end of rivet 10, which is opposite the rivet head portion 12.

Figure 3:
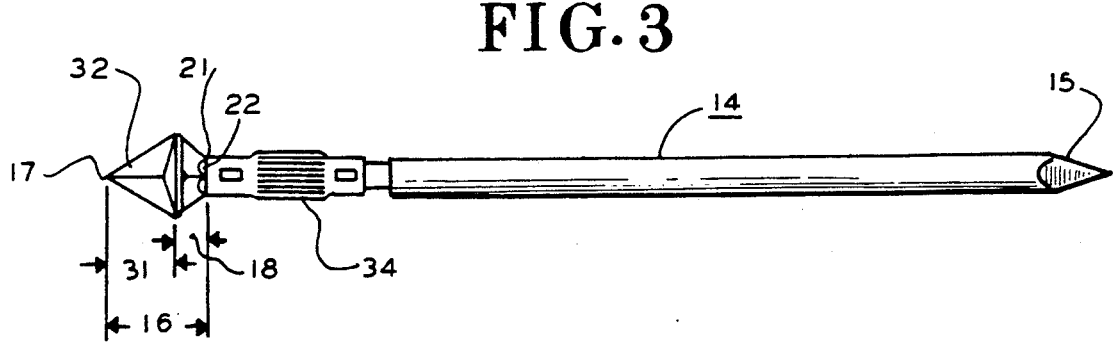
FIG. 3 is a side elevation of the rivet mandrel.
Figure 4:
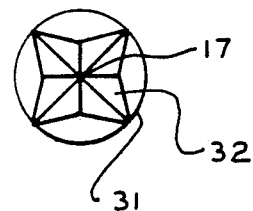
FIG. 4 is an end-view of the left end of the rivet mandrel of FIG. 3.

Referring now to FIG. 3 of the drawings, the head portion 16 of the mandrel includes a self-piercing end portion 31 which terminates in a self-piercing point 17, and further includes cutting portion 18 which functions to cut and peel back the rivet body into separate portions which curls back on the rivet body.

As particularly shown, the cutting portion 18 is comprised of cutting points 21 which are circumferentially spaced from each other, and surfaces 22, positioned between the cutting points, and which extend angularly outwardly from the main body portion of the rivet mandrel 14. Upon pulling of the mandrel 14 back through the bore 13 of the rivet 10, the cutting points 21 cut the rivet body 11 into separate sections, and the surfaces 22 cause the rivet body portion to peel and curl back onto the rivet body.

As hereinabove indicated, the head portion 16 of the rivet mandrel 14 also includes a self-piercing portion, generally designated as 31, with the self-piercing portion 31 being comprised of self-piercing point 17 and undercut surfaces 32, which extend angularly outwardly from the point 17, and which form circumferentially spaced stabilizing fins 32.

As particularly shown, the surfaces 32 slope at an angle of approximately 30 degrees with respect to the horizontal, and the surfaces 21 slope in an opposite direction, at an angle with respect to the horizontal of about 60 degrees.

Similarly, as particularly shown, there are four fins 32, which are spaced from each other by approximately 90 degrees.

The body portion 14 of the mandrel further includes a plurality of longitudinal grooves 34, adjacent to the head portion 16, which grooves 34 function to score the interior of the rivet to facilitate cutting thereof into separate sections by the cutting points 21. The longitudinal grooves 34, as well as scoring the inside of the rivet 10 act as a vibration-resistant mechanism to insure the mandrel head 16 does not come out once the rivet is in place.

Figure 2:
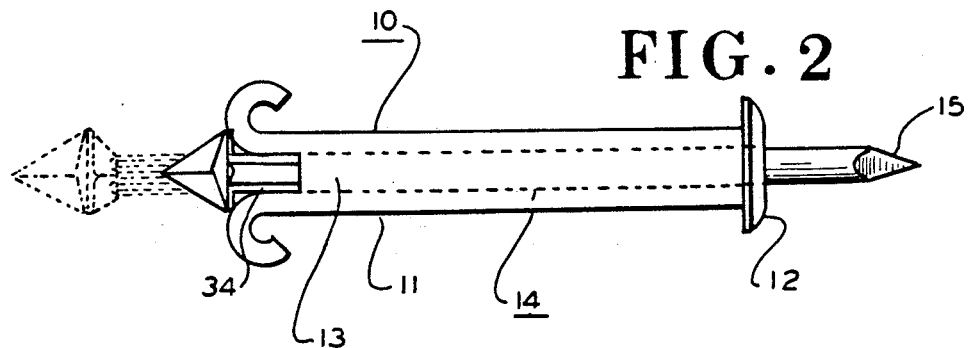

As shown in FIGS. 1 and 2 of the drawings, the mandrel is positioned in the rivet 10 with the head portion 16 thereof extending out of the main body portion 11 of the rivet 10, with the cutting points 21 of the head 16 being contiguous with the surface 34 of the rivet.

In operation, on pulling of the mandrel 14 through the bore 13 of rivet 10, the cutting points 21 cut the rivet body into separate portions, and the surfaces 22 spread the cut portions outwardly away from the mandrel 14, and cause the cut portions to curl back against the rivet body to thereby increase the strength of the rivet.

The rivet of the present invention, may be formed in lengths longer than those previously used in the art. Thus, for example, in general, rivets generally have a length which is not in excess of two inches. In accordance with the present invention, it is possible to provide rivets having lengths in excess of two inches, preferably in excess of three inches, and up to about 9½ inches, and even greater.

The rivet is particularly useful for connecting a wide variety of materials, and has particular application to fastening of roofing substrates, such as insulation and/or roof membranes to roof decks during the installation of roofs. Thus, for example, the rivet may be employed for attaching roof insulation and/or roof membranes to lightweight, metal, and wood roof decks. Lightweight decks can be Tectum, Permadeck or Martins Fireproofing cementitious wood fiber decks between 2" and 5" thick. Metal decks can be 18 gauge to 28 gauge corrugated metal decks. Wood decks can be ½" to 1" plywood or wood plank ¾" to 1" thick. Lightweight decks can also include poured or plank gypsum as well as lightweight concrete fill over a metal pan. The peel rivet will work in all of them.

In addition, the combination of rivet and mandrel in accordance with the present invention can be used even if the rivet and mandrel do not completely pierce through the materials which are to be attached to each other. Thus, in accordance with the present invention, upon drawing of the mandrel through the rivet, the rivet will peel back, and form a fastener of increased strength, even if the rivet has not completely pierced through all of the materials. For example, the rivet body will open inside a lightweight roof deck without piercing completely through the roof deck. The four sections of the rivet body will open; however, the density of the roof deck will determine how effective the tensile pull-out is.

Figure 5:
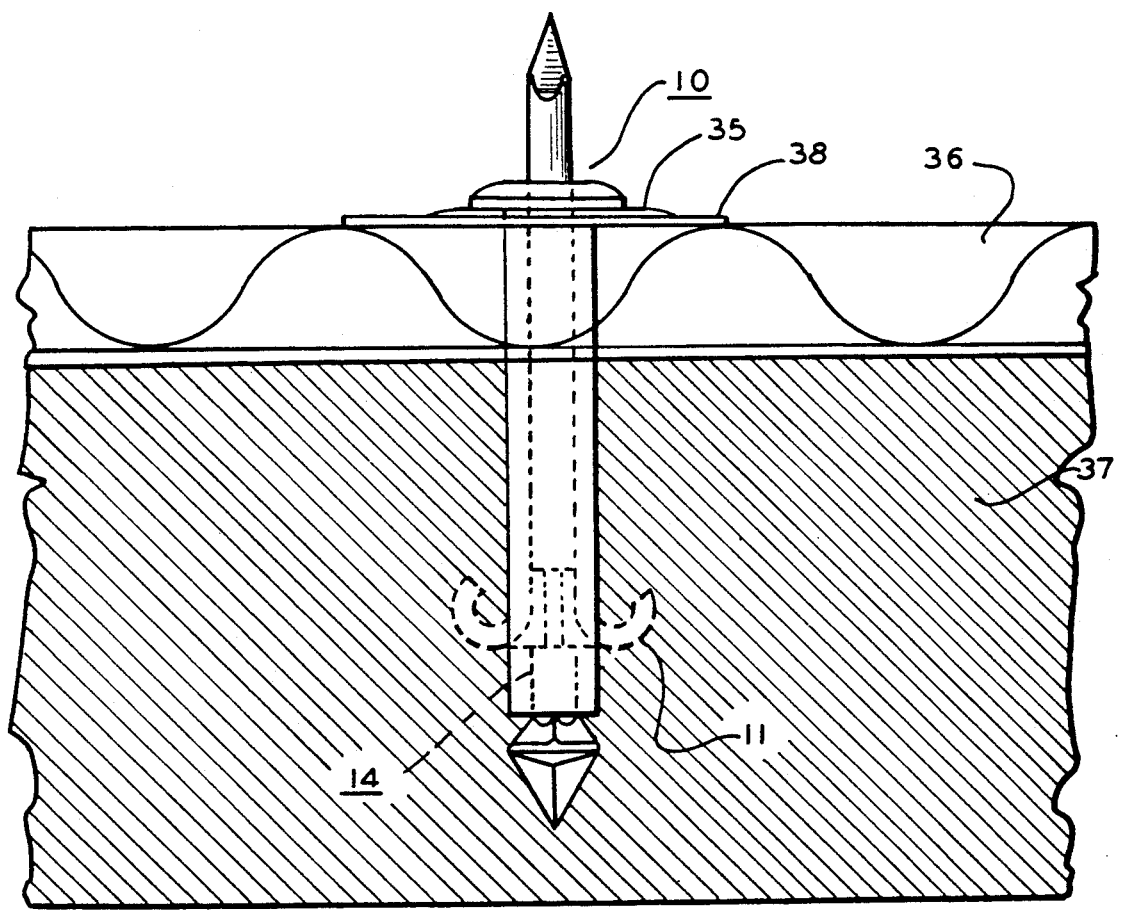
FIG. 5 is a cut-away side view of a rivet in accordance with the present invention inserted into a roof deck without piercing entirely through the roof deck.

FIG. 5 shows an arrangement wherein the rivet 10 is inserted in a roof substrate overlying a roof deck 37 and into a roof deck 37 without completely piercing through the roof deck 37. Referring to FIG. 5, the substrate comprises insulation 36 and/or a roof membrane 38. As shown in FIG. 5, the rivet 10 and mandrel 14 are inserted through a stress plate 35 which lies on top of insulation 36 and are driven through a layer of insulation 36 and/or a roof membrane 38 and into the roof deck 37. In some cases, the membrane 38 may overlie the roof deck 37 in the absence of insulation 36. Shown in phantom is the peeling back of the rivet body 11 after the rivet 10 is inserted into the roof deck 37.

The rivet will be installed with a special installation tool holding a stack of stress plates and rivets on a plastic banding. The rivets would automatically index into place over the stress plate. The tool will push the rivet 10 through the stress plate 35, pulling it out of the holder and therein driving the rivet 10 and mandrel 14 through the insulation 36 and into the deck material 37. The rivet 10 does not penetrate the deck 37 totally and opens inside the deck material 37.

The mandrel 14 is contained in the bore 13 of the rivet 10. The head 16 of the mandrel extends outwardly from the bottom end of the rivet 10. The rivet 10 and mandrel 14 assembly are inserted through an opening in the stress plate 35. The self-piercing point 17 of the head 16 of the mandrel 14 pierces through the insulation 36 and/or the membrane 38 and then travels into the roof deck 37 but does not completely pierce through the roof deck 37. Thus, the mandrel 14 of which is connected in the bore 13 of the rivet 10 has inserted the rivet 10 into the roof deck 37. The head 12 of the rivet 10 rests on top of the stress plate 35.

Once in place, the mandrel 14 is pulled to peel the rivet back. The cutting points 21 of cutting portion 18 of the mandrel begin to cut the body 11 of the rivet 10 and peel back the rivet into the portions which curl back on the rivet body 11. This peeling process is done inside the roof deck 37. By virtue of the rivet 10 being peeled back, roof deck 37, insultation 36, and/or roof membrane 38 are clamped together. Once enough resistance has been put on the mandrel, it will break at the designated break point. The top of the mandrel will be pulled by air pressure into a holding chamber. The rivet 10 and mandrel 14 thus serve as a fastener for fastening a substrate to a roof deck 37.

These and other advantages of the present invention should be apparent to those skilled in the art from the teachings herein.

Numerous modifications and variations of the present invention are possible in light of the above teachings and, therefore, within the scope of the appended claims, the invention may be practiced otherwise than as particularly described.

What is claimed is:

1. A method comprising:
   inserting a rivet having at least a body portion and a mandrel having means for cutting and peeling back said rivet into portions which curl back on the rivet body into a solid substance comprising a roof deck and a roofing substrate overlying said roof deck, wherein said rivet is inserted through said roofing substrate and into said roof deck without completely piercing through said roof deck, without pre-drilling a hole in said solid substance for receiving said rivet and said mandrel, said rivet and said mandrel being inserted into said solid substance simultaneously; and
   moving said mandrel to cut and peel back said rivet into portions which curl back on the rivet body within said roof deck.

2. The method of claim 1 wherein said rivet has a head portion and a body portion.

3. The method of claim 1 wherein said means of said mandrel for peeling back said rivet comprises a head portion of said mandrel.

4. The method of claim 3 wherein said head portion of said mandrel includes means for cutting and peeling back said rivet into portions which curl back upon said rivet body.

5. The method of claim 4 wherein said head portion of a said mandrel further includes a self-piercing point at an end opposite that of said cutting means.

6. The method of claim 1 wherein said substrate comprises a layer of insulation overlying said roof deck.

7. The method of claim 6 wherein said substrate further comprises a roofing membrane overlying said layer of insulation.

8. A method of fastening together at least one material to a roof deck, wherein said at least one material comprises a layer of insulation overlying said roof deck, said method comprising:
   inserting a rivet having at least a body portion and a mandrel having means for cutting and peeling back said rivet into portions which curl back on the rivet body through said at least one material and into the roof deck without completely piercing through the roof deck without pre-drilling a hole in said at least one material and said roof deck for receiving said rivet and said mandrel; and cutting and peeling back said rivet into portions which curl back on the rivet body within the roof deck to fasten the at least one material to the roof deck.

9. The method of claim 8 wherein the at least one material further comprises a roofing membrane overlying said layer of insulation.

10. The method of claim 8 wherein said rivet has a head portion and a body portion.

11. The method of claim 8 wherein said mandrel further includes a self-piercing end.

12. The method of claim 8 wherein said rivet has a length in excess of 2 inches.

13. The method of claim 8 wherein said rivet has a length in excess of 3 inches.

14. The method of claim 13 wherein said rivet has a length of at least about 3 inches up to about 9½ inches.

* * * * *